Sept. 8, 1959  A. L. EVERITT  2,903,208
RESILIENT MOUNTING
Filed Sept. 10, 1956  2 Sheets-Sheet 1

INVENTOR.
ALLEN L. EVERITT
BY
HIS ATTORNEY

Sept. 8, 1959 A. L. EVERITT 2,903,208
RESILIENT MOUNTING
Filed Sept. 10, 1956 2 Sheets-Sheet 2
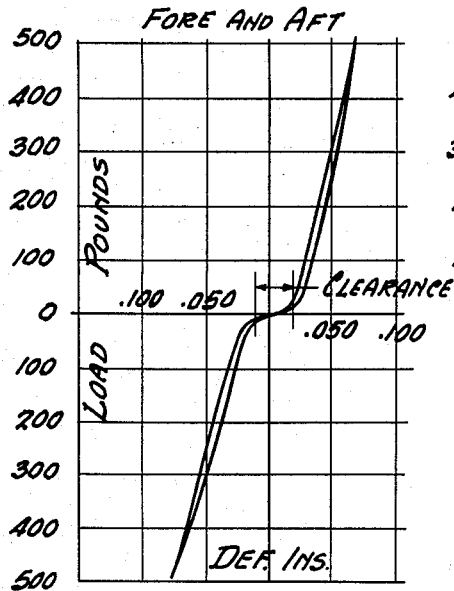
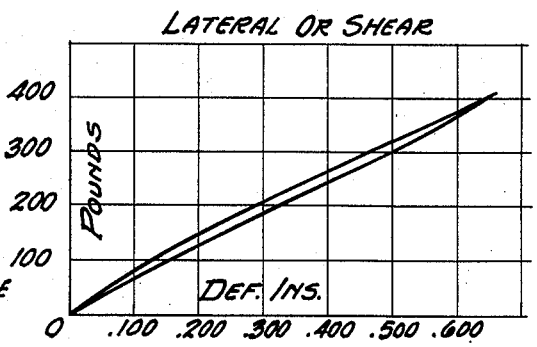
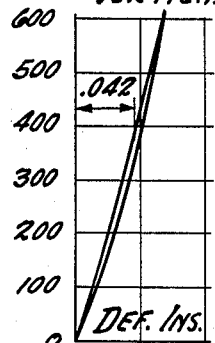
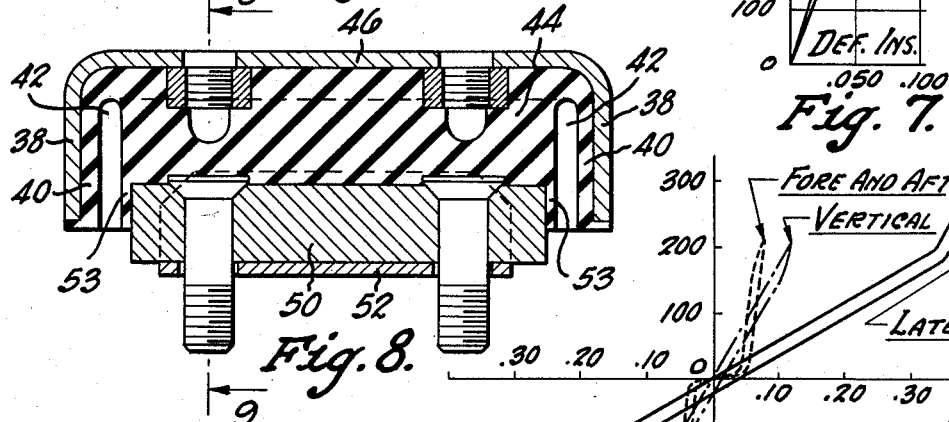
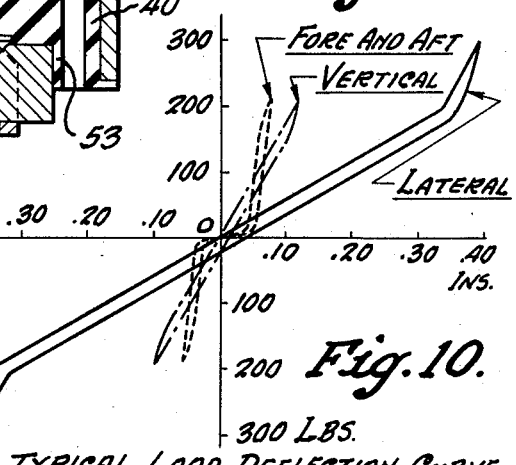
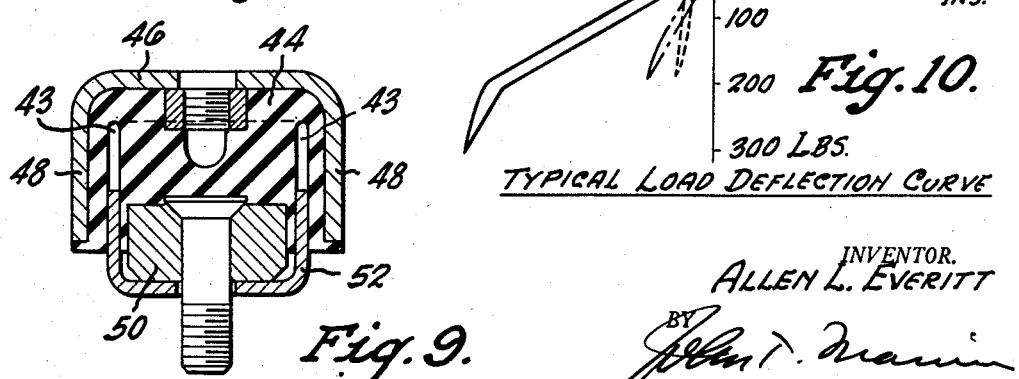
INVENTOR.
ALLEN L. EVERITT
BY
HIS ATTORNEY United States Patent Office 2,903,208
Patented Sept. 8, 1959

2,903,208
RESILIENT MOUNTING

Allen L. Everitt, Dayton, Ohio, assignor to General Motors Corporation, Detroit, Mich., a corporation of Delaware Application September 10, 1956, Serial No. 609,002

3 Claims. (Cl. 248—9)

This invention relates to resilient mountings and particularly to rubber engine mountings.

In mounting an internal combustion engine on a supporting structure such as automobile frame, it is conventional to employ relatively soft rubber insulating cushion mountings between the engine and the frame which readily yield with elastic resistance to relative movement between the engine and the frame to reduce transmission of vibratory forces to the frame and thereby provide added riding comfort.

The vibratory forces due to engine torque are more pronounced in a direction transverse to the engine crankshaft than in the vertical or fore and aft directions. While a large degree of freedom of movement of the engine, with elastic restraint, is effective in minimizing torsionally excited vibratory forces, practical considerations necessitate a restraint of the range of relative movement in the different directions with the greatest range of free movement being permitted in the transverse direction.

It has become conventional and desirable to mount engines by means of a three point mounting or its equivalent which includes a pair of spaced mounts, one on each side of the engine, either at the front or back end of the engine, and a third mount disposed on the opposite end of the engine, centrally thereof. The side mounts are generally in the form of a rubber pad sandwiched between a pair of attachment plates and provide for free movement of the engine except as restrained by the elastic resistance or resistance to shear of the rubber. The third or centrally disposed mount has provision for restricting fore and aft movement while permitting relatively free transverse and vertical movement.

It is an object of the present invention to provide an improved engine mount adapted for use as the central mount of three point automotive engine mount which is efficient in operation and economical to manufacture.

It is a further object of the invention to provide an improved engine mounting connection which lends itself to accurate dimensional control in the manufacture thereof and with suitable design provides for a desired rate (spring rate) buildup or a desired limitation of movement in the vertical, transverse and fore and aft directions.

In its preferred form the mount includes an elongated U-shaped attachment plate and a second elongated attachment plate, narrower than the U-shaped plate, which is disposed between the legs of the U-shaped plate and spaced from the base and legs thereof, and an elastomeric mass or cushion substantially fitting the space between the legs and base of the U-shaped plate and the second plate, which is bonded to both the legs and base of the U-shaped plate and the second plate. A pair of elongated slots are provided in the elastomeric mass, one in each of the elastomeric portions between the legs of the U-shaped member and the second attachment plate which are disposed parallel to the legs and to a predetermined depth. A feature of the invention lies in an elongated U-shaped spacer or insert disposed over the second attachment plate, the legs of which extend partially into the said grooves. When the mount is centrally located with respect to the engine and aligned to have its longitudinal axis on the transverse plane of the engine, vertical movement is relatively free over amplitude or range of vertical movement of the engine and is limited if desired by movement of the insert legs and flow of elastomeric material filling the lower portions of the grooves; fore and aft movement is limited by the insert legs occupying space within the grooves; and transverse motion of the engine is unrestrained except for the elastic resistance of the rubber.

The U-shaped insert or spacer is not bonded to the elastomeric material and preferably a small clearance is provided between the outer sides of the spacer legs and the groove sides to allow for relatively unrestrained fore and aft movement of the engine over a relatively small fore and aft amplitude. This has the beneficial effect of providing little or no damping at low loads or idle speeds of the engine and frictional dynamic damping in airplanes at higher speeds and loads. If desired the ends of the U-shaped attachment plate may be provided with flanges having an inner elastomeric facing to limit the transverse motion of the engine.

Further objects and advantages of the present invention will be apparent from the following description, reference being had to the accompanying drawings wherein preferred embodiments of the present invention are clearly shown.

In the drawings:

Figure 5 is a graph showing fore and aft load deflection curves.

Figure 6 is a graph showing transverse or shear load deflection curves.

Figure 7 is a graph showing vertical load deflection.

Figure 8 is a cross sectional view of another mount taken along its longitudinal axis.

Figure 9 is a cross sectional view taken along line 9—9 of Figure 8.

Figure 10 is a graph showing fore and aft, transverse and vertical deflection curves of the mount shown in Figure 8.

Figure 2:
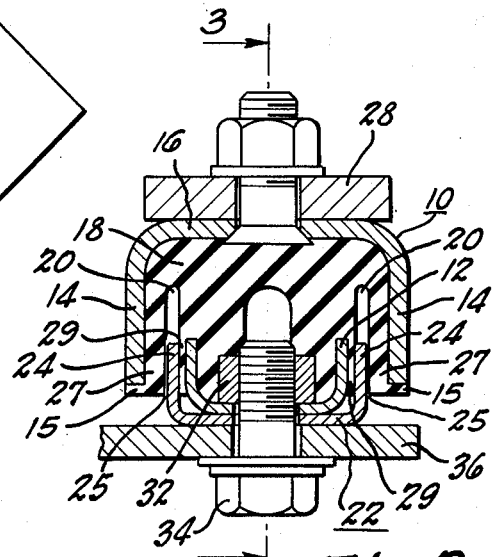
Figure 2 is a cross sectional view of the mount taken along lines 2—2 of Figure 1.
Figure 3:
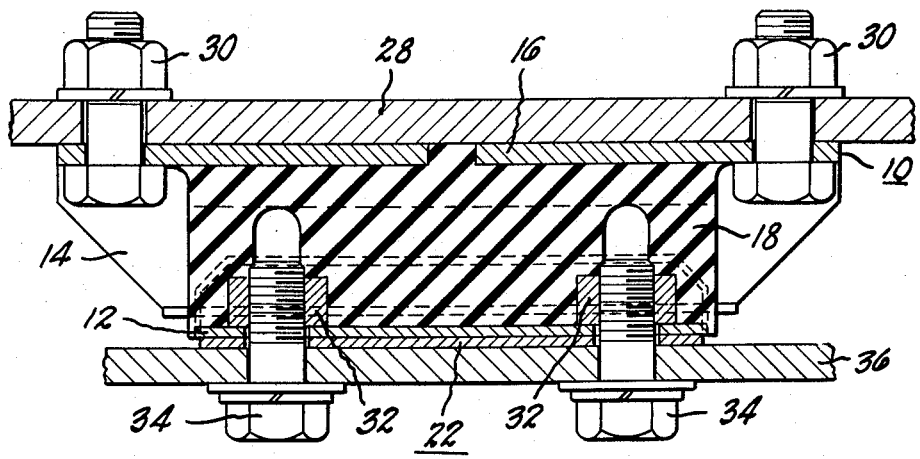
Figure 3 is a cross sectional view taken along line 3—3 of Figure 2.
Figure 4:
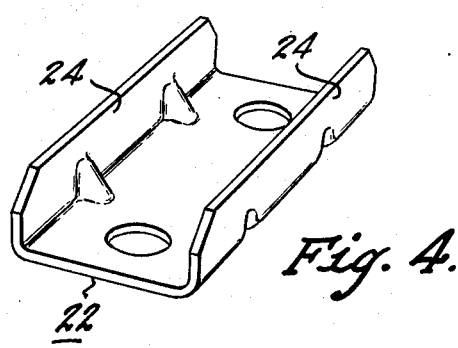
Figure 4 shows in perspective a U-shaped insert or spacer.

The present invention will now be described in a preferred form in reference to the appended drawings. Referring to Figures 2 and 3 the mount includes an elongated U-shaped attachment plate 10 of relatively heavy construction and a second relatively narrow attachment plate 12 disposed between the legs 14 of plate 10 in spaced relation and spaced from the base 16 of the plate 10. A relatively soft elastomeric mass or cushion 18 such as soft rubber, is provided between the plates 10 and 12 which fills the space between the legs 14 and the base 16 of plate 10 and is bonded coextensively to inner surfaces of plate 10. The attachment plate 12 is preferably imbedded in the elastomeric mass 18 and is co-extensively bonded thereto. The attachment plate 12 is shown in Figures 2 and 3 as a U-shaped member having the legs thereof imbedded in the elastometric mass. However, the plate 12 may be of other suitable forms such as for example a rectangular bar 50 shown in Figure 8, which is imbedded in the elastomeric cushion. Longitudinally of the plates 10 and 12, between each of the legs 14 and the plate 12, parallel to legs 14, are provided relatively deep longitudinal grooves 20. The mount further includes an elongated U-shaped spacer or insert 22, inserted over the attachment plate 12 and having the legs 24 thereof partially extending into the grooves 20.

Figure 1:
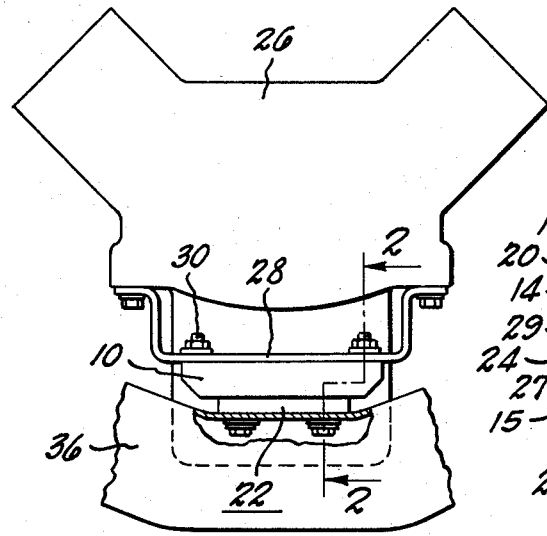
Figure 1 is an elevation of an engine supported on a frame, a fragment of which is shown, by means of a cushioned connector or mount.

As shown in Figure 1 the mount may be ideally employed as a central support of a three point engine mounting of the type described above where the attachment plate 10 is disposed centrally of the engine 26 (along the longitudinal or fore and aft axis thereof) with its longitudinal plane aligned in the lateral or transverse plane of the engine. To this end the attachment plate 10 is secured to a bracket 28 of the engine by means of nuts and bolts 30. The other attachment plate 12 is preferably provided with internal nuts 32 for receiving bolts 34 by means of which the attachment plate 12 and spacer 22 are secured to a supporting structure such as an automobile frame 36.

It may be seen that transverse motion of the engine 26 relative to the frame 36 is unrestrained by the mount except by reason of the elastic resistance of the elastomeric mass 18. Figure 6 shows the lateral or transverse deflection of the mount in inches corresponding to an applied load in pounds, and it may be seen that the resistance to shear of the rubber builds up gradually and proportionally to the load buildup.

The vertical movement of engine is damped by reason of the resistance to distortion of the rubber. Since rubber is substantially non-compressible the slots 20 are formed to extend to a depth considerably beyond the ends of the legs 24 of the spacer so that on compression of the elastomeric mass 18 the rubber will flow into unoccupied portions of the grooves 20 thereby permitting free vertical motion of the engine except as limited by resistance of the rubber to distortion. The elastomeric mass 18 is preferably formed to cover the ends of legs 14 of the attachment plate by a layer 15 to prevent metal to metal contact in the event of unusual vertical movement of the engine. It may be seen that the relative vertical freedom of movement may be limited by the depth of the grooves 20. Thus relatively shallow grooves would reduce the degree to movement of the engine because the open portions of the grooves would be filled the rubber flowing therein due to the distortion of the rubber to result in a limit to vertical movement. However, the preferred depth of the grooves are such as to produce a rate build up curve such as is shown in Figure 7 wherein resistance to vertical motion is limited substantially only by the elastic resistance of the rubber.

As may be seen fore and aft movement is limited as shown by the load deflection curves of Figure 5. It will be noted that for small fore and aft deflection up to about 0.025 inch the movement is free except as limited by the resistance of the elastomeric mass to shear. Thereafter the load rises sharply with added deflection. As pointed out above this has a beneficial effect in that little or no damping is effected at low or idling speeds so as to eliminate undue shaking or movement of the car, and beneficial damping is obtained at higher speeds or loads. The relatively free movement at low or idling speeds is accomplished by providing a relatively small clearance between the outer sides of the legs 24 of the spacer and elastomeric layer 27 between the legs 14 of the plate 10 and the spacer legs 24. The elastomeric layer 27 is formed of sufficient thickness to provide for adequate fore and aft rate or loads. At higher speeds or loads the free character of the insert legs 24 relative to the elastomer layer 27 and the inner elastomeric portions 29 of the elastomeric mass 18, results in friction resistance between the legs 24 and the adjacent elastomeric surfaces 27 and 29 to produce a dynamic frictional damping.

The mount of the present invention is also advantageous in that it is economical to manufacture. In making the mount the U-shaped attachment plate 10 and the plate 12 are positioned in a suitable mold and the elastomeric material is molded therebetween and bonded to these members in a single operation which includes the provision of grooves 20. The spacer 22 is separately formed by a single stamping operation and inserted in the grooves.

In some instances it may be desirable to limit transverse or lateral movement. To this end the present mount may be modified to include lateral flanges 38 to Figures 8 and 9 having an elastomeric backing layer 40 bonded thereto. To permit a desired degree of relatively free transverse motion of the engine grooves 42 connecting with grooves the longitudinal grooves 43 are formed in the elastomeric mass 44. In this embodiment the attachment plate 46 may be advantageously provided in the form of a rectangular cup which may be further described as a rectangular plate having a continuous flange, including end flange portions 38 and side flange portions 48. The second attachment plate is here shown as a rectangular plate 50. However, this member may be in the form of a U-shaped plate seen as the plate 12 of Figure 2. The effect of the end flanges 38 is shown on the lateral deflection curve of Figure 10. The presence of the elastomeric portions 40 as in the case of the elastomeric portions 27 of Figure 2 prevent a sharp increase in load build up and provide suitable damping at extreme deflection points. Additional transverse control may be achieved by providing the insert 52 with end flanges (not shown) which extend partially into grooves 42 and snugly contact the walls 53 of grooves 42 which function in a manner similar to the legs or flanges 24 relative to grooves 20.

It may be seen that the cushioned mount of the present invention is readily adaptable by simple design to a considerable variation in performance as may be necessary in various different installations. Thus as pointed out above vertical movement may be controlled by the depth of grooves 20 or the height of spacer legs 24. Fore and aft movement may be controlled by the width of the clearances 25 or the thickness of spacer legs 24 and transverse or lateral movement by the presence of flanges 38 and the width of the grooves 42. Further all of these dimensions may be accurately controlled in the manufacture of the mount whereby a mass production of mounts of uniform performance is facilitated.

By the term "elastomeric" used herein is meant any of the relatively soft rubbers conventionally used in motor mounts which may include natural rubber, butadiene-styrene copolymers, butadiene-acrylonitrile copolymers, polychloroprene and mixtures of these and similar materials.

While the embodiments of the present invention as herein disclosed constitute preferred forms, it is to be understood that other forms might be adopted.

What is claimed is as follows:

1. In a cushion mount of the character described, a pair of elongated attachment plates, one of said plates being a U-shaped channel member having a base and opposed legs extending transversely therefrom, an elastomeric deformable mass substantially filling the space between the legs and the base of said channel member and being bonded coextensively thereto, said elastomeric mass including a pair of opposed grooves of substantial depth extending longitudinally thereof and parallel to the legs of said channel member, said other attachment plate being embedded in the elastomeric mass between the grooves and bonded coextensively to the mass, and a further elongated U-shaped channel member having opposed legs extending therefrom, said legs of said last mentioned channel member having a length less than depth of said grooves so that said legs of said last mentioned member extend only partially into said grooves whereby a limited transverse movement of the several plates relative to one another is permitted as governed by filling of open portions of said grooves by said elastomeric deformable mass flowing therein due to distortion there of under compressive force.

2. In a cushion mount of the character described, a pair of elongated attachment plates, one of said plates being a U-shaped channel member having a base and opposed legs extending laterally therefrom, the other of said plates being disposed substantially within the channel member and spaced from the legs thereof, an elastomeric mass filling the space between the plates and being coextensively bonded to both plates, said mass including two longitudinal grooves therein, one of which is disposed along each side of said other plate and in parallel relation to the legs of said channel member, and a further elongated channel member having a base and opposed legs thereon disposed with its legs inserted within said grooves, the legs of said last-mentioned channel member being of less height than the depth of said grooves whereby the connection provides resiliency longitudinally and vertically and relatively less resiliency transversely thereof.

3. In a cushion mount of the character described, a first and second channel-shaped attachment member, each including a base and opposed longitudinally extending leg portions, said members and said leg portions having complementary positions aligned for telescoping of the second channel member into the first with the leg portions of said members extending from the bases thereof in opposite directions, a mass of elastomeric material disposed between all portions of said two members and bonded coextensively thereto for resiliently holding the members in spaced relation, said mass including a pair of parallel grooves extending at either side thereof and positioned at locations intermediate the legs of the two channel-shaped members, a third channel-shaped member including a base and opposed longitudinally extending legs adapted to fit over the second of the pair of channel-shaped members so that its legs extend only partially into said grooves wherein movement of said legs is restricted due to deformation of said mass of elastomeric material, and attaching means to join the third member to the second member.

References Cited in the file of this patent

UNITED STATES PATENTS

| | | |
|---|---|---|
| 1,930,310 | Geyer | Oct. 10, 1933 |
| 2,214,942 | Taub | Sept. 17, 1940 |
| 2,621,876 | Else | Dec. 16, 1952 |